US008199490B2

(12) United States Patent
Wilkenfeld

(10) Patent No.: US 8,199,490 B2
(45) Date of Patent: Jun. 12, 2012

(54) ELECTRONIC DEVICE SUPPORT SYSTEM

(76) Inventor: Eran Wilkenfeld, New York, NY (US)

( * ) Notice: Subject to any disclaimer, the term of this patent is extended or adjusted under 35 U.S.C. 154(b) by 268 days.

(21) Appl. No.: 12/730,390

(22) Filed: Mar. 24, 2010

(65) Prior Publication Data

US 2010/0195278 A1    Aug. 5, 2010

Related U.S. Application Data

(63) Continuation-in-part of application No. 12/697,251, filed on Jan. 31, 2010.

(60) Provisional application No. 61/148,941, filed on Jan. 31, 2009.

(51) Int. Cl.
*G06F 1/16* (2006.01)
*H05K 5/00* (2006.01)
*H05K 7/00* (2006.01)

(52) U.S. Cl. ......... 361/679.55; 361/679.02; 361/679.24; 361/679.41

(58) Field of Classification Search ............. 361/679.02, 361/679.24, 679.41–679.45, 679.55
See application file for complete search history.

(56) References Cited

U.S. PATENT DOCUMENTS

| | | | | | |
|---|---|---|---|---|---|
| 4,957,264 | A * | 9/1990 | Hakanen | .................... | 248/510 |
| 5,038,688 | A * | 8/1991 | Permenter | ..................... | 108/43 |
| 5,623,869 | A * | 4/1997 | Moss et al. | ..................... | 108/43 |
| 5,673,628 | A * | 10/1997 | Boos | ............................ | 108/44 |
| 5,715,139 | A * | 2/1998 | Nakajima | ................ | 361/679.55 |
| 5,839,713 | A * | 11/1998 | Wright | .................... | 248/346.01 |
| 5,859,762 | A * | 1/1999 | Clark et al. | ............. | 361/679.41 |
| 6,113,050 | A * | 9/2000 | Rush | .................... | 248/346.01 |
| 6,119,184 | A * | 9/2000 | Takahama | .................... | 710/303 |
| 6,305,653 | B1 * | 10/2001 | Oldham et al. | ............. | 248/177.1 |
| 6,375,134 | B1 * | 4/2002 | Goldschmidt et al. | ........ | 248/154 |
| 6,424,524 | B2 * | 7/2002 | Bovio et al. | ............. | 361/679.45 |
| 6,443,543 | B1 * | 9/2002 | Chiang | .................... | 312/223.3 |
| 6,491,268 | B1 * | 12/2002 | Channer et al. | ............ | 248/176.1 |
| 6,585,212 | B2 * | 7/2003 | Carnevali | ................. | 248/346.07 |
| 6,604,720 | B1 * | 8/2003 | Wilson | ........................ | 248/177.1 |
| 6,707,668 | B2 * | 3/2004 | Huang | ..................... | 361/679.48 |
| 7,009,840 | B2 * | 3/2006 | Clark et al. | .............. | 361/679.41 |
| 7,032,872 | B2 * | 4/2006 | Sullivan | ................... | 248/346.07 |
| 7,161,799 | B2 * | 1/2007 | Lim et al. | .................. | 361/679.55 |
| 7,278,644 | B2 * | 10/2007 | Villarreal | .................. | 280/47.26 |
| 7,286,344 | B2 * | 10/2007 | Kim | ......................... | 361/679.41 |
| 7,474,524 | B1 * | 1/2009 | Shaw | ........................ | 361/679.02 |
| 7,513,470 | B2 * | 4/2009 | Lomberk | .................... | 248/177.1 |
| 7,611,112 | B2 * | 11/2009 | Lin | ............................. | 248/274.1 |
| 7,806,376 | B2 * | 10/2010 | Song et al. | .................. | 248/177.1 |
| 7,828,253 | B2 * | 11/2010 | Meyer | ........................... | 248/129 |
| 7,857,541 | B2 * | 12/2010 | Gong | ........................ | 403/322.3 |
| 7,859,836 | B2 * | 12/2010 | Bae | .......................... | 361/679.55 |
| 7,891,630 | B2 * | 2/2011 | Lipman et al. | ................ | 248/371 |
| 7,922,137 | B2 * | 4/2011 | Derry et al. | ................. | 248/274.1 |
| 2001/0015005 | A1 * | 8/2001 | Chung et al. | ..................... | 29/458 |
| 2002/0018335 | A1 * | 2/2002 | Koizumi | ....................... | 361/687 |
| 2002/0159231 | A1 * | 10/2002 | Nguyen et al. | ................ | 361/686 |

(Continued)

*Primary Examiner* — Jinhee Lee
*Assistant Examiner* — Adrian S Wilson
(74) *Attorney, Agent, or Firm* — Garcia-Zamor IP Law; Ruy M. Garcia-Zamor

(57) ABSTRACT

The support system of the present invention provides an enhanced mounting system for electronic devices which makes portable use of the electronic devices simpler and more efficient. One exemplary application for which this system is very useful is photography. The system preferably, but not necessarily, includes a support platform that may be secured to a tripod, rolling stand, quick release plate, or to any other suitable support structure.

20 Claims, 10 Drawing Sheets

U.S. PATENT DOCUMENTS

| | | | |
|---|---|---|---|
| 2003/0231466 A1* | 12/2003 | Huang | 361/687 |
| 2004/0007651 A1* | 1/2004 | Williams et al. | 248/346.06 |
| 2004/0165348 A1* | 8/2004 | Clark et al. | 361/686 |
| 2004/0226791 A1* | 11/2004 | Levy | 190/11 |
| 2005/0023022 A1* | 2/2005 | Kriege et al. | 174/52.4 |
| 2005/0150432 A1* | 7/2005 | Wen | 108/38 |
| 2006/0061964 A1* | 3/2006 | Cheng | 361/687 |
| 2008/0003860 A1* | 1/2008 | Carnevali | 439/296 |
| 2008/0278909 A1* | 11/2008 | Lev et al. | 361/687 |
| 2009/0152428 A1* | 6/2009 | Cilia | 248/346.03 |
| 2009/0154079 A1* | 6/2009 | Bae | 361/679.02 |

* cited by examiner

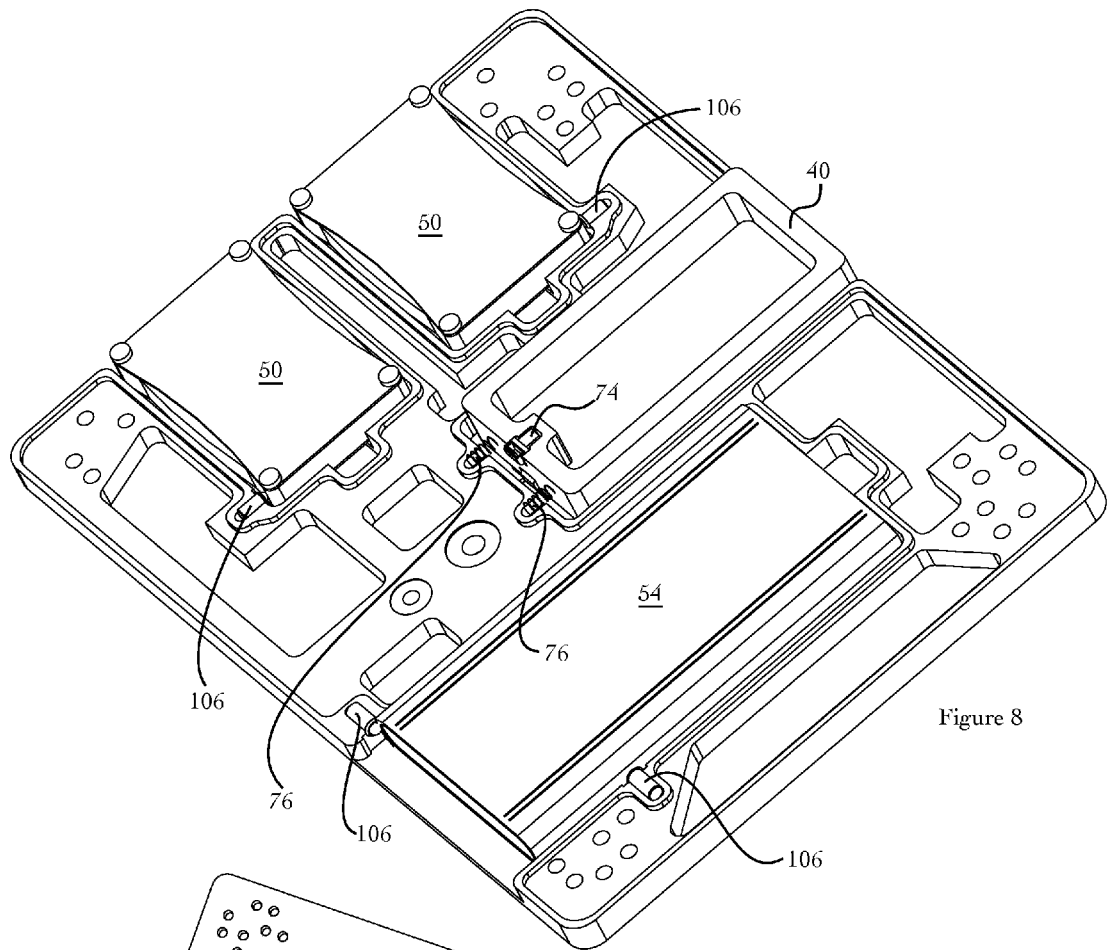
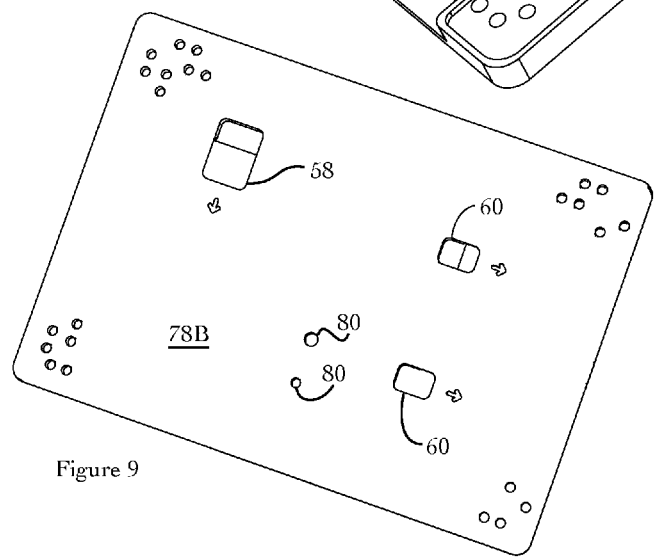
Figure 8
Figure 9

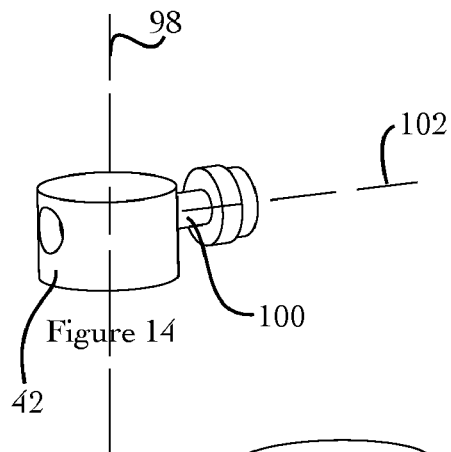
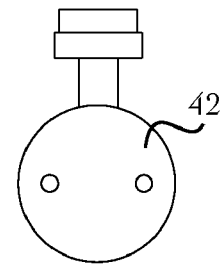
Figure 14　　　　　Figure 15
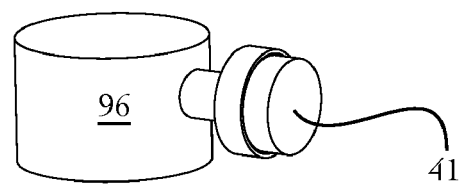
Figure 16
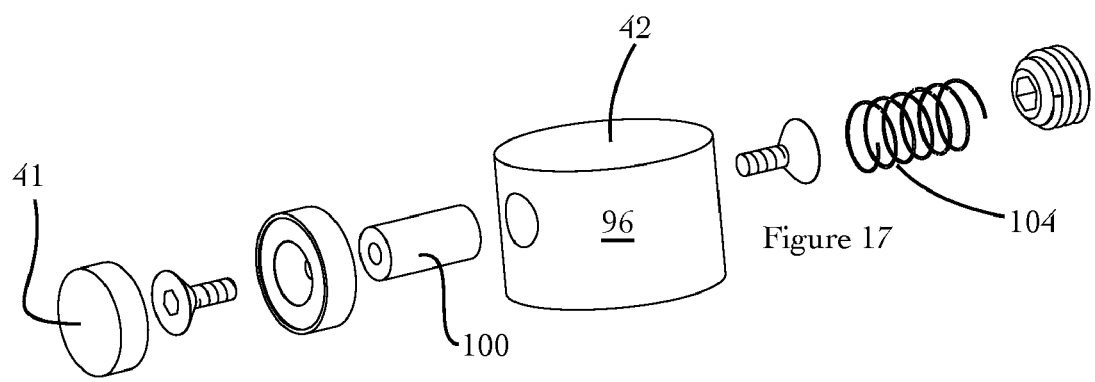
Figure 17
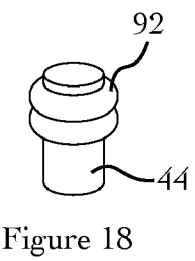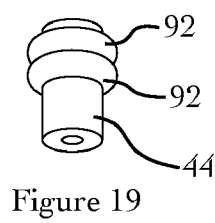
Figure 18　　　　　Figure 19

ELECTRONIC DEVICE SUPPORT SYSTEM

CROSS REFERENCE TO RELATED APPLICATION

This application claims benefit of and priority to each of the following patents: (1) U.S. patent application Ser. No. 12/697,251, filed on Jan. 31, 2010, invented by Eran Wilkenfeld; and (2) U.S. provisional patent application 61/148,941, filed on Jan. 31, 2009, invented by Eran Wilkenfeld, and each of the above patents is hereby incorporated by reference herein as if set forth in its entirety.

BACKGROUND

The present invention is directed to electronic devices and, more specifically, to electronic device support systems.

SUMMARY

Briefly speaking, one embodiment of the present invention is directed to a system configured to support an electronic device including a support platform comprising first and second major exterior surface layers and a core. The core comprising polymer. The support platform is configured to support a laptop thereon. At least one blocker is located on the first major exterior surface layer of the support platform. The at least one blocker is detachably engageable at multiple locations along the first major exterior surface layer. At least one dynamic hold down is located on the first major exterior surface layer of the support platform and is adapted to, in combination with the at least one blocker, secure the laptop in position on the first major exterior surface layer of the support platform. The at least one dynamic hold down is detachably engageable at multiple locations on the first major exterior surface layer. The core defines at least one battery cavity adapted to detachably engage a battery positioned therein and secure the battery separately from the laptop so that the battery can later be removed from the at least one battery cavity and connected to the laptop. The core also defines at least one hard drive support cavity adapted to detachably engage a hard drive positioned therein and secure the hard drive separately from the laptop so that the hard drive can later be removed from the at least one hard drive cavity and connected to the laptop. A tripod is detachably engaged to the second major exterior surface layer to secure the support platform in a desired position.

In a separate aspect, one embodiment of the present invention is directed to a method of supporting an electronic device. The method including the steps of: providing a support platform comprising first and second exterior surface layers and a core. The support platform being configured to support a laptop thereon. The method also including the steps of: attaching the support platform to a tripod; providing at least one blocker and at least one dynamic hold down on the first major exterior surface layer of the support platform, the at least one blocker and the at least one dynamic hold down being detachably engageable at multiple locations along the first major exterior surface layer to allow laptops of varying sizes to be secured to the support platform; detachably locating a supplemental hard drive in the core; detachably locating a battery in the core; and positioning the laptop on the support platform and adjusting the at least one blocker and the at least one dynamic hold down to secure the laptop thereto.

In a separate aspect, one embodiment of the present invention is directed to a method of supporting an electronic device. The method including the steps of: providing a support platform including first and second exterior surface layers and a core. The core is formed using computer numerical control equipment to manufacture first and second polymer halves which are then secured together using adhesive to form the core. The support platform is configured to support a laptop thereon. The method also including the steps of: attaching the support platform to a tripod; providing at least one blocker and at least one dynamic hold down on the first major exterior surface layer of the support platform, the at least one blocker and the at least one dynamic hold down being detachably engageable at multiple locations along the first major exterior surface layer to allow laptops of varying sizes to be secured to the support platform; detachably locating a supplemental hard drive in the core; detachably locating a battery in the core; positioning the laptop on the support platform and adjusting the at least one blocker and the at least one dynamic hold down to secure the laptop thereto; providing a hood formed by a plurality of panels that are hinged together to allow the hood to move between a compacted orientation and an enlarged operational orientation; the hood being detachably securable to the support platform, the hood being detachably engageable with the support platform via hook and loop material, a curtain is detachably attached to the hood to completely enclose the laptop supported on the support platform.

In a separate aspect, one embodiment of the present invention is directed to a method of supporting an electronic device. The method including the steps of: providing a support platform including first and second exterior surface layers and a core. The core is formed using computer numerical control equipment to manufacture first and second polymer halves which are then secured together using adhesive to form the core. The support platform is configured to support a laptop thereon. The method also including the steps of: attaching the support platform to a tripod; providing at least one blocker and at least one dynamic hold down on the first major exterior surface layer of the support platform, the at least one blocker and the at least one dynamic hold down being detachably engageable at multiple locations along the first major exterior surface layer to allow laptops of varying sizes to be secured to the support platform; detachably locating a supplemental hard drive in the core; detachably locating a battery in the core; positioning the laptop on the support platform and adjusting the at least one blocker and the at least one dynamic hold down to secure the laptop thereto; providing a hood formed by a plurality of panels that are hinged and detachably securable together with hook and loop material to allow the hood to move between a compacted orientation and an enlarged operational orientation; the hood being detachably securable to the support platform, the hood being detachably engageable with the support platform via hook and loop material, a curtain is detachably attached to the hood to completely enclose the laptop supported on the support platform.

In a separate aspect, the present invention is directed to a system configured to support an electronic device. The system includes a support platform including first and second major exterior surface layers and a core. The core includes polymer. The support platform is configured to support a laptop thereon. At least one blocker is located on the first major exterior surface layer of the support platform. The at least one blocker is detachably engageable at multiple locations along the first major exterior surface layer. At least one dynamic hold down is located on the first major exterior surface layer of the support platform and adapted to, in combination with the at least one blocker, secure the laptop in position on the first major exterior surface layer of the support platform. The at least one dynamic hold down being detachably engageable at multiple locations on the first major exterior surface layer. The core defines at least one battery cavity adapted to detachably engage a battery positioned therein and secures the battery spaced apart from the laptop while allowing the battery to power the laptop without having to remove the battery from the at least one battery cavity. The core also defines at least one hard drive support cavity adapted to detachably engage a hard drive positioned therein and spaced apart from the laptop so that the hard drive can be used by the laptop without having to remove the hard drive from the at least one hard drive cavity.

In a separate aspect, the present invention is directed to a method of supporting an electronic device. The method includes the steps of: providing a support platform having first and second exterior surface layers, the support platform being configured to support a laptop thereon; attaching the support platform to a tripod; providing at least one blocker and at least one dynamic hold down on the first major exterior surface layer of the support platform, the at least one blocker and the at least one dynamic hold down being detachably engageable at multiple locations along the first major exterior surface layer to allow laptops of varying sizes to be secured to the support platform; detachably locating a supplemental hard drive in the support platform, the supplemental hard drive being spaced apart from the laptop but configured for use by the laptop without needing to remove the supplemental hard drive from the support platform; detachably locating a battery in the support platform, the battery being spaced apart from the laptop but configured for use by the laptop without needing to remove the battery from the support platform; and positioning the laptop on the support platform and adjusting the at least one blocker and the at least one dynamic hold down to secure the laptop thereto.

In a separate aspect, the present invention is directed to a system configured to support an electronic device, including a support platform having first and second major exterior surface layers. At least one blocker is located on the first major exterior surface layer of the support platform. The at least one blocker is detachably engageable at multiple locations along the first major exterior surface layer. At least one dynamic hold down is located on the first major exterior surface layer of the support platform and adapted to, in combination with the at least one blocker, secure the laptop in position on the first major exterior surface layer of the support platform. The at least one dynamic hold down being detachably engageable at multiple locations on the first major exterior surface layer. Wherein the support platform defines at least one battery cavity adapted to detachably engage a battery positioned therein and secure the battery spaced apart from the laptop while allowing the battery to power the laptop. The support platform also defines at least one hard drive support cavity adapted to detachably engage a hard drive positioned therein and secure the hard drive spaced apart from the laptop while allowing the laptop to use the hard drive.

In a separate aspect, the present invention is directed to a system configured to support an electronic device, including a support platform. The support platform is configured to secure the laptop in position thereon. Wherein the support platform defines at least one battery cavity adapted to detachably engage a battery positioned therein and secure the battery spaced apart from the laptop while allowing the battery to power the laptop. The support platform also defines at least one hard drive support cavity adapted to detachably engage a hard drive positioned therein and secure the hard drive spaced apart from the laptop while allowing the laptop to use the hard drive.

BRIEF DESCRIPTION OF THE DRAWINGS

The following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 8 is a perspective view of the bottom half of the support platform of FIG. 1 illustrating the securing of hard drives, a battery, and drawer therein;

FIG. 9 is perspective view of the bottom of the support platform illustrating tripod bores for securing the tripod thereto;

FIG. 14 is a side view of a preferred dynamic hold down of the support system of FIG. 1;

FIG. 15 is a bottom plan view of the dynamic hold down of FIG. 14;

FIG. 16 is a perspective view of the dynamic hold down of the support system of FIG. 14;

FIG. 17 is an exploded view of the preferred dynamic hold down of the support system of FIG. 1;

FIG. 18 is a perspective view of a preferred blocker for use with the support system of FIG. 1;

FIG. 19 is a second perspective view of a preferred blocker for use with the support system of FIG. 1;

DETAILED DESCRIPTION OF THE PREFERRED EMBODIMENTS

Figure 1:
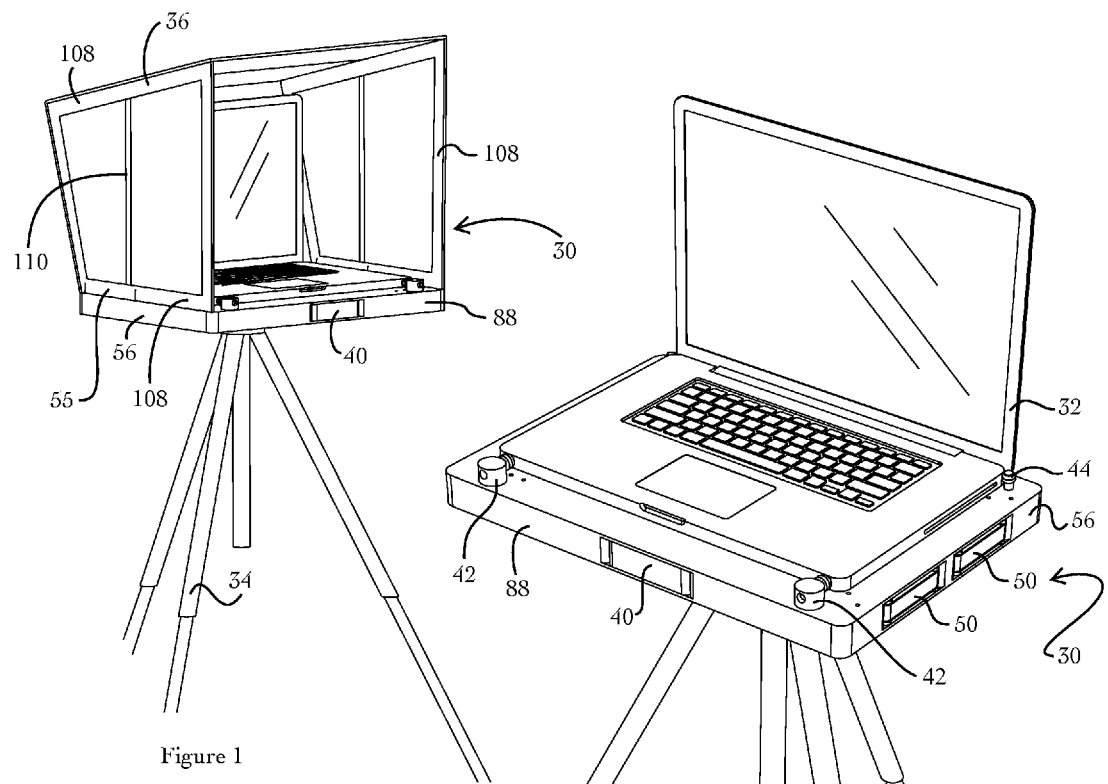
FIG. 1 is a perspective view of an electronic device support system (hereinafter referred to as "the support system") according to a preferred embodiment of the present invention; A hood is attached to the support platform of the support system; A laptop is secured to the first major exterior surface layer with the hood shown in the enlarged, operational orientation; The hood reduces the glare which occurs when viewing the laptop monitor screen.
Figure 2:
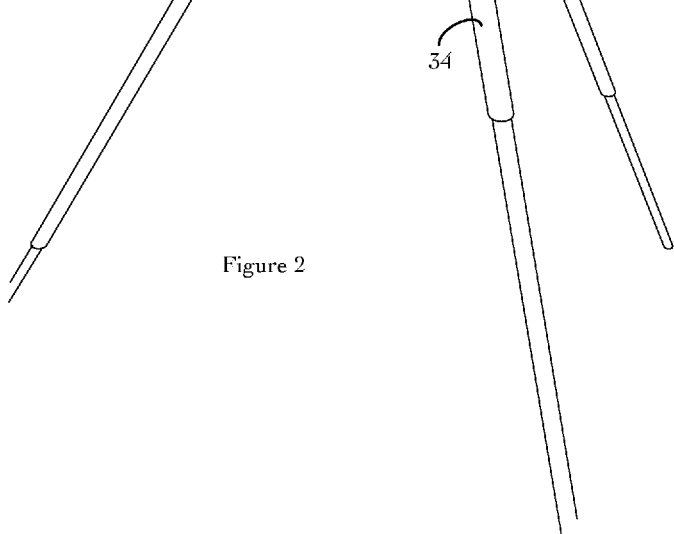
FIG. 2 is an enlarged, second perspective view of the support system of FIG. 1 illustrating two dynamic hold downs positioned on the first major exterior surface layer and in front of the laptop; A blocker is shown on the right side of the laptop to assist in securing the laptop to the support platform; Openings to hard drive cavities defined by the core are shown on the right of the support platform; A drawer is located in the front of the support platform.

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the electronic device support system (hereinafter referred to as "the support system" and designated parts thereof. The word "laptop", as used in the claims and in the corresponding portions of the specification, means "any one of a laptop, portable computer, tablet computer, computers in which the keypad is integrated with a touch screen, and the like". The language "at least one of 'A', 'B', and 'C'," as used in the claims and in corresponding portions of the specification, means "any group having at least one 'A'; or any group having at least one 'B'; or any group having at least one 'C'; —and does require that a group have at least one of each of 'A', 'B', and 'C'." Additionally, the words "a" and "one" are defined as including one or more of the referenced item unless specifically stated otherwise. The terminology includes the words above specifically mentioned, derivatives thereof, and words of similar import.

Referring to FIGS. 1-25, wherein like numerals indicate like elements throughout, there are shown preferred embodiments of the support system 30. Briefly speaking, the support system 30 of the present invention provides an enhanced mounting system for laptops which makes portable use of the laptop simpler and more efficient. One application for which this system is very useful is photography. The system 30 preferably includes a support platform 56 that may be secured to a tripod 34. It is preferred that the platform include cavities/slots for receiving either one or more hard drives and/or one or more batteries. It is preferred that a hood is securable to the laptop support platform to enhance visibility of the laptop screen during use. The support system 30 includes a support platform 56 that grips an electronic device, such as a laptop, tight to the top. The support platform 56 can be secured to a tripod 34, stand or quick-release plate to create a uniquely mobile workstation. It preferably also includes slots to safely house hard drives 50 and a battery 54. A drawer 40 may also be included. All the components are presently designed to create positive locks to hold the electronic device 32 and all support devices in place if the support system 30 is tilted or jarred by moderate impact so that it can be easily transported while setup and used in a variety of locations and "real world" situations. The support system 30 preferably also includes a hood 36 and dark curtain 109.

The core 88 of the laptop support platform is preferably made of polymer. However, those of ordinary skill in the art will appreciate from this disclosure that any suitable material, such as wood can be used without departing from the scope of the present invention. It is preferred that the core 88 is formed of made of expanded Polyvinyl Chloride (PVC) which forms a foam-like material that is uniform and easy to cut, light, and water proof. The entire core can be cut out of one rectangular piece of foam, allowing great accuracy in manufacture and ability to create a more stabilizing pattern for the unused sections of the core, as well as removal of material for weight reduction in these unused portions.

It is preferred, but not necessary, that each of the components of the laptop support platform is cut on a computer numerical control (CNC) mill, then cleaned up to remove any burrs and foreign materials. The process may include then scoring the facing edges with sandpaper, inserting the spring plungers into the slots in the foam core 88, coat with an adhesive agent and using a form to promote alignment, attach the three together. This approach allows increased speed in manufacture and increased accuracy of parts as opposed to hand making them. Specific customer needs can be accommodated as few forms are made to increase time and cost. Each one is essentially custom made. From one sheet of material multiple variations can be created for different laptop types. While the drawings show a laptop having a typical configuration, those of ordinary skill in the art will appreciate that the support system 30 can be used with and/or adapted for use with laptops of any configuration without departing from the scope of the present invention. All in one run. As each computer has a custom size shape and port location, this flexibility is vital to accommodating users' needs.

The support system 30 is configured to support an electronic device, such as a laptop, 32. The support system 30 includes a support platform 56 which is preferably formed by first and second sections 62A, 62B which can be secured together. The sections are preferably formed of polymer, but any other material can be used without departing from the scope of the present invention. In one embodiment, the first and second sections 62A, 62B may include first and second major exterior surface layers 78A, 78B and a core 88. The core 88 preferably comprises polymer. The support platform preferably has a generally rectilinear shape, but those of ordinary skill in the art will appreciate from this disclosure that the support platform 56 can have any shape without departing from the scope of the present invention. Similarly the entire support platform 56 can be formed by a single unitary member without departing from the scope of the present invention.

Figures 6, 7:
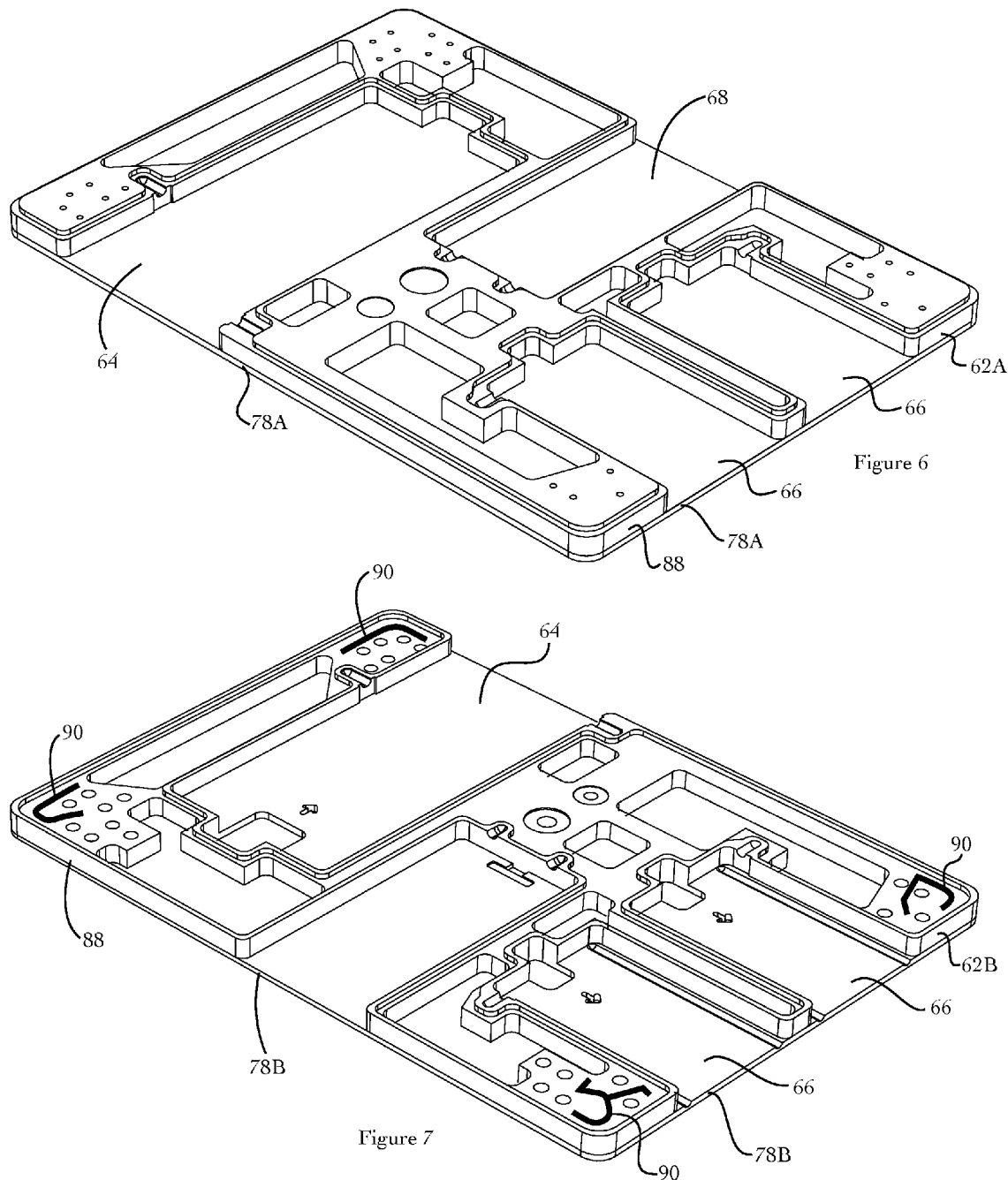
FIG. 6 is a perspective view of the top half of the support platform turned upside down to show a preferred configuration of the core; The first major exterior surface layer is positioned over the top (bottom in this figure) side of the first half of the core.
FIG. 7 is a perspective view of the bottom half of the support platform to show a preferred configuration of the core; The second major exterior surface layer is positioned under the bottom side of the second half of the core.
Figure 25:
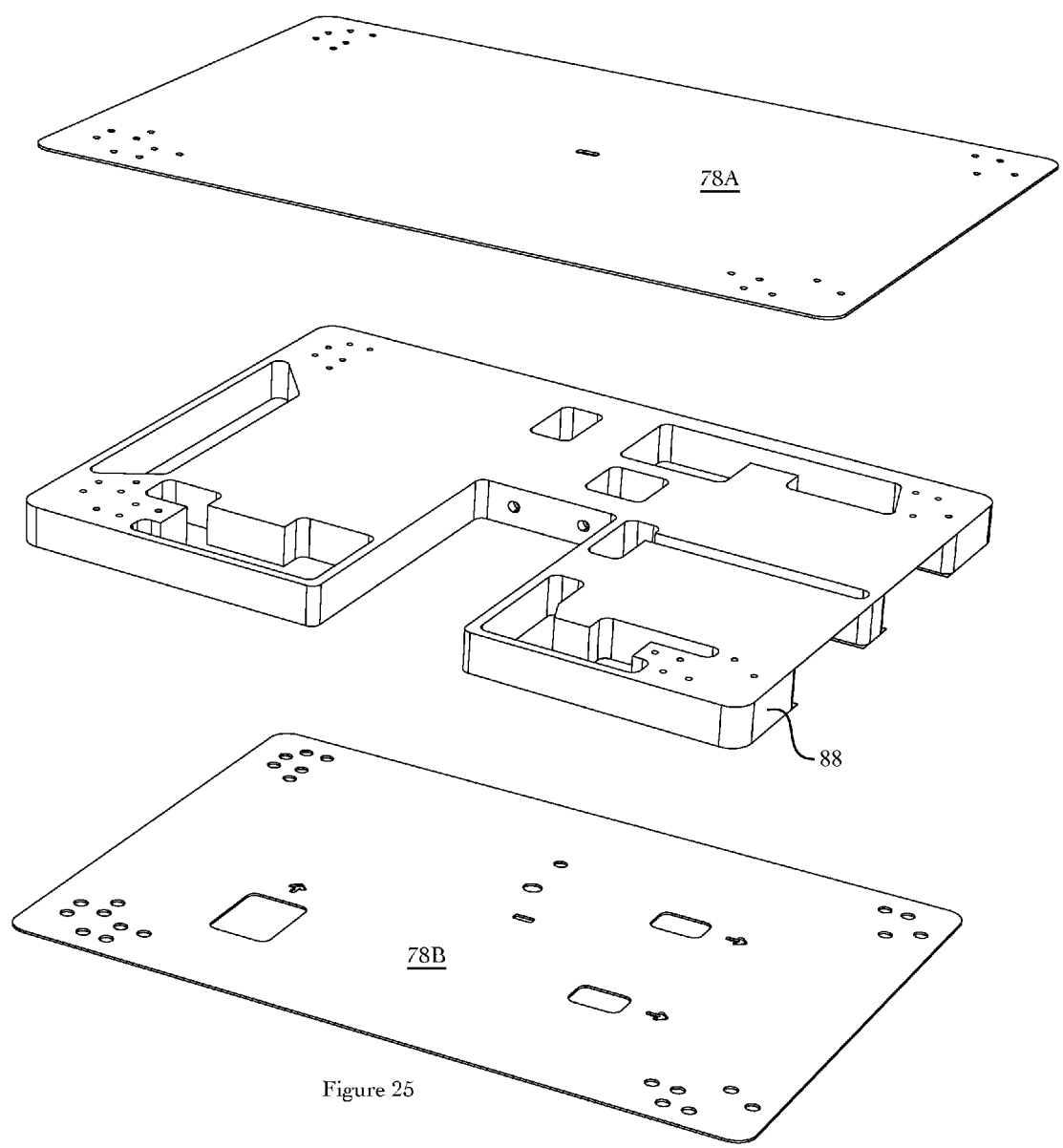
FIG. 25 is an exploded view of the support system of FIG. 1 showing the first and second major exterior surface layers prior to securing to the core.

Referring to FIGS. 6, 7, and 25, the first and second major exterior surface layers 78A, 78B may be harder than the core 88. However, it is preferred that the first and second major exterior surface layers 78A, 78B are formed by paint. Alternatively the layers 78A, 78B may be formed of any one or combination of wood, steel, aluminum, another polymer, or the same material as the core, etc. without departing from the scope of the present invention.

Figure 3:
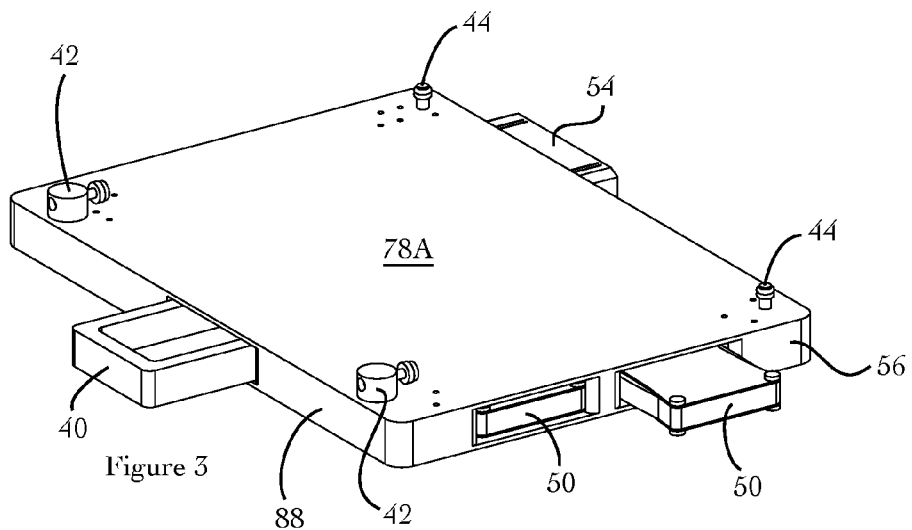
FIG. 3 is a perspective view of the support platform illustrating a supplemental battery extending partially from the rear of the support platform.
Figure 11:
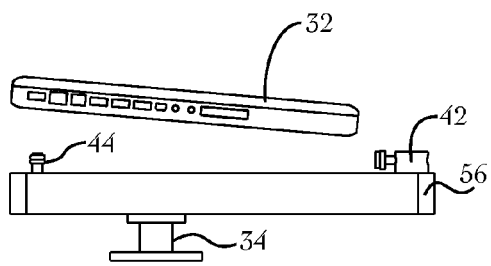
FIG. 11 is a side view of the support system of FIG. 1 with a laptop about to be positioned thereon.
Figure 12:
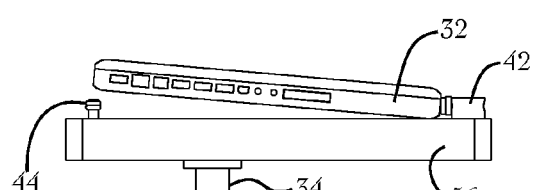
FIG. 12 is a side view of the support system of FIG. 1 illustrating a laptop being pushed against the dynamic hold downs to allow the laptop to be positioned generally flat on the support platform.
Figure 13:
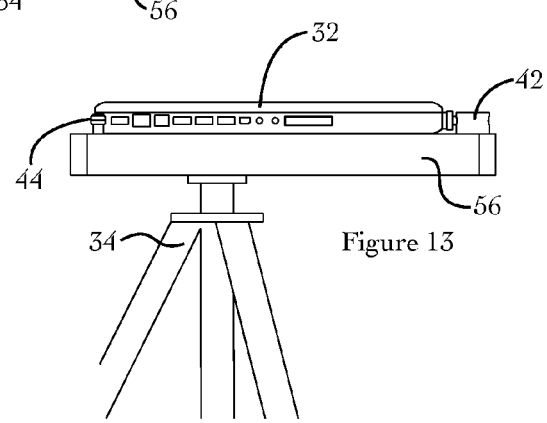
FIG. 13 is a side view of the support system of FIG. 1 illustrating the laptop positioned against the support platform with the dynamic hold downs securing the laptop against the blockers.

Referring to FIGS. 11-13, the support platform 56 is preferably configured to support a laptop 32 thereon. Referring to FIGS. 6 and 7, in one preferred embodiment, it is preferred, but not necessary, that the core 88 is formed by first and second polymer sections 62A, 62B. The first and second polymer sections 62A, 62B may be secured together in a coextensive fashion via an adhesive layer 90, or any other suitable method such as fasteners or sonic welding, to form the core 88. While FIG. 7 shows the adhesive layer 90 having a particular pattern, those of ordinary skill in the art will appreciate from this disclosure that the adhesive layer can have any configuration or thickness without departing from the scope of the present invention. Referring to FIGS. 3 and 6, The core 88 may further include a drawer cavity 68 from which a drawer 40 is extendable. The drawer 40 is preferably generally formed by the same polymer as the core 88.

Figure 10:
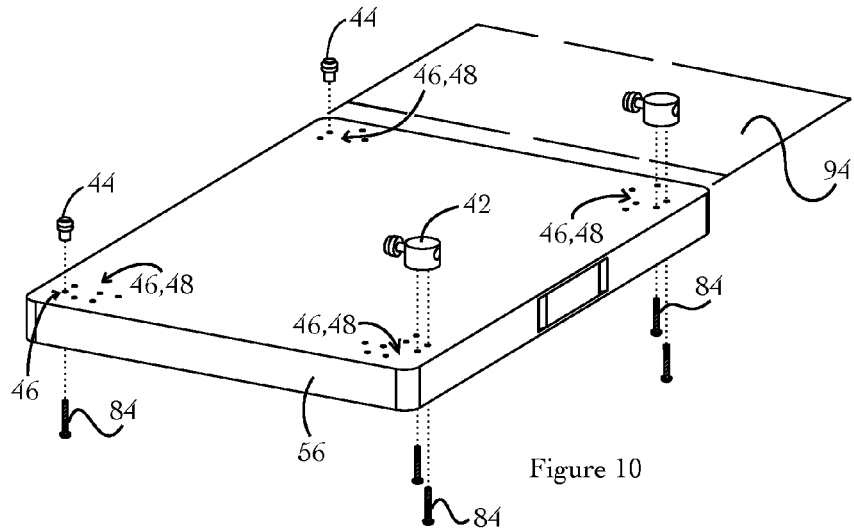
FIG. 10 is a perspective view of the support platform with dynamic hold downs and blockers being secured thereto by fasteners that extend through the support platform; A plane generally defined by the support platform is shown.

Referring to FIGS. 3, 18, and 19, at least one blocker 44 may be located on the first major exterior surface layer 78A of the support platform 56. The at least one blocker 44 can be detachably engageable at multiple locations along the first major exterior surface layer 78A. The blocker 44 is preferably a cylinder that may be detachably positioned on the top of the support platform 56 and can be made of plastic or any other suitable material. A groove may be cut into the cylinder to allow the placement of one or more rubber o-rings 92 or other bumper material that provides the stickiness and softness to hold the computer securely in position. The preferred use of multiple o-rings 92 makes assembly easier and provides multiple "ridges" of friction. The cylinder can be drilled and tapped so that it can be attached via a fastener 84 from below as shown in FIG. 10. Due to multiple blocker bores 46, the blocker 44 is preferably detachably positionable at different locations on the support platform 56 to allow for efficient reconfiguration so that the platform 56 is preferably a universal platform 56 suitable for use with many varieties of laptops. It is preferred that the blocker bores 46 and the hold down bores 48 are similarly sized so that they can each support either blockers 44 or hold downs 42.

Referring to FIGS. 10 and 14-17, at least one dynamic hold down 42 is located on the first major exterior surface layer 78A of the support platform 56 and adapted to, in combination with the at least one blocker 44, secure the laptop 32 in position on the first major exterior surface layer 78A of the support platform 56. The pillar can be drilled and tapped so that it can be attached via 2 fasteners 84 from below as shown in FIG. 10. Due to multiple hold down bores 48, the at least one dynamic hold down 42 is detachably engageable at multiple locations on the first major exterior surface layer 78A. Each of the at least one dynamic hold downs 42 preferably includes a pillar 96 configured to detachably engage the support platform 56 so that a pillar longitudinal axis 98 of the pillar 96 is generally perpendicular to a plane 94 formed by the support platform 56. A plunger 100 may be slideably positioned within the pillar 96 and can be configured so that a plunger longitudinal axis 102 is generally perpendicular to the pillar longitudinal axis 98. A biasing element 104 may be configured to drive the plunger 100 generally outwardly from the pillar 96. This dynamic hold down 42 configuration is preferably spring loaded. Multiple types can be used to accommodate different computer models.

Referring to FIGS. 11-13, when one needs to place the computer 32 on the support platform 56, one pushes one side of the laptop 32 against the spring-loaded dynamic hold down(s) 42 then one sets the computer flat. It is preferred, but not necessary, that the laptop have its own laptop battery and its own hard drive separate and apart from those that are housed in the support platform. That allows the laptop 32 to preferably only use its battery when a battery 54 is being exchanged in the support platform 32. In a similar fashion, the laptop hard drive allows the laptop to operate while the support platform hard drive 50 is being replaced or otherwise occupied performing other computing functions. When released the biasing element 104 (preferably a spring) expand to take up the available distance to ensure the laptop 32 makes full contact with the blockers 44 on the other side creating opposing points of contact against a friction creating material. The rubber tips 41 of the dynamic hold downs 42 will be replaceable as they will be adhesive pads.

The core 88 may define at least one battery cavity 64 adapted to detachably engage a battery 54 positioned therein and secure the battery 54 separately from the laptop 32 so that the battery 54 can directly power the laptop 32 from its location in the battery cavity 64. If a new battery 54 is needed, then the battery 54 can be removed from the battery support cavity 64 and a new battery 54 inserted therein. The connection between the battery 54 in the support platform 30 and the laptop 32 can be wired, via contacts, wireless, or use any other suitable method. It is preferred, but not necessary, that the battery 54 is an external, extended life, battery which may be much larger than those removable, internal batteries typically used with laptops. The core 88 may also define at least one hard drive support cavity 66 adapted to detachably engage a hard drive 50 positioned therein and secure the hard drive 50 separately from the laptop so that the hard drive 50 and is preferably used by the laptop 32 while located in the hard drive support cavity 66. If a new hard drive 50 is needed, then the hard drive 50 can be removed from the hard drive support cavity 66 and a new hard drive 50 inserted therein. The connection between the hard drive 50 in the support platform 30 and the laptop 32 can be wired, via contacts, wireless, or use any other known suitable method. The hard drive 50 is preferably, but not necessarily, an external hard drive in its own enclosure which is not designed for insertion into a laptop 32. Hard drives are preferably held in position in the hard drive cavity 66 via plungers 106 and batteries 54 are preferably held in position in the battery cavity 64 via plungers 106.

The preferred plungers 106 are nylon plungers, but any suitable material can be used without departing from the scope of the present invention. It can be positioned directly ahead of the battery 54 when in its fully inserted position so that there is resistance to the battery 54 exiting. In manufacture, the plunger 106 may be placed in a slot cut in the core by the computer numerical control mill. In certain configurations two plungers 106 may be placed in the same slot for added resistance more evenly spread. Although one preferred type of locking mechanism is shown, those of ordinary skill in the art will appreciate from this disclosure that any suitable locking/retention mechanism can be used without departing from the scope of the present invention. While particular shapes and relative sizes of batteries 54 and hard drives 50 are illustrated in the drawings, those of ordinary skill in the art will appreciate from this disclosure that the present invention can be configured to work with any computer batteries 54 or hard drives 50. As such, the size, shape, and number of the battery cavity(s) 64 and the hard drive cavity(s) 66 can vary without departing from the scope of the present invention.

Figure 5:
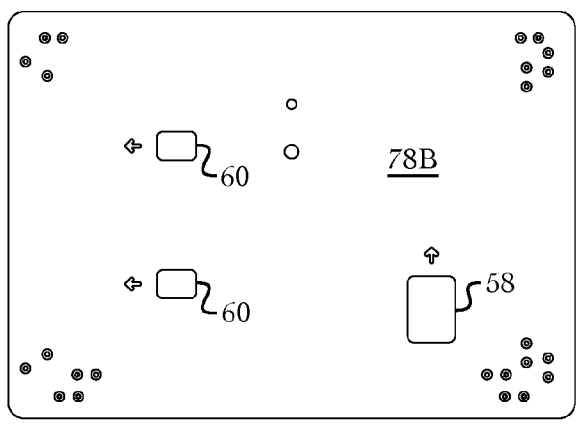
FIG. 5 is a bottom plan view of the support platform showing the second major exterior surface layer of the support platform of the support system of FIG. 1; The second major exterior surface layer defines cutouts that allow a user to insert a finger and disengage a supplemental battery or a supplemental hard drive from its cavity.

Referring to FIGS. 5 and 9, the second major exterior surface layer 78B of the support platform 56 defines a plurality of holes/cutouts 58, 60 configured to allow a user to manually eject a hard drive 50 from the at least one hard drive cavity 66 and to allow a user to manually eject a battery 54 from the at least one battery cavity 64.

Figure 20:
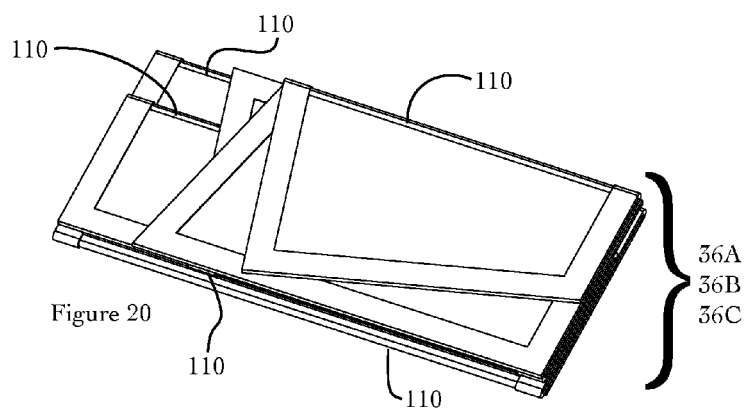
FIG. 20 is a perspective view of the preferred hood of the support system of FIG. 1; The hood is formed by multiple panels that are detachably hinged together to allow the hood to be positioned into a compacted orientation.
Figure 21:
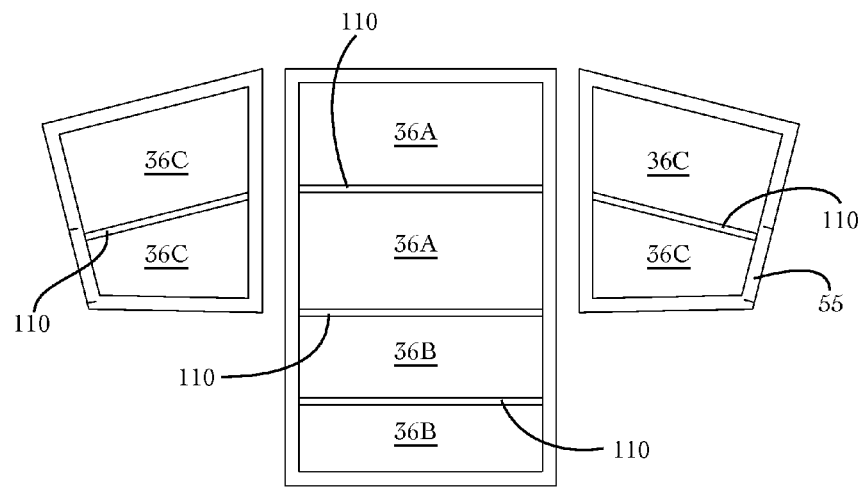
FIG. 21 is a top view plan of three panels that are preferably used to form the hood of FIG. 1.
Figure 22:
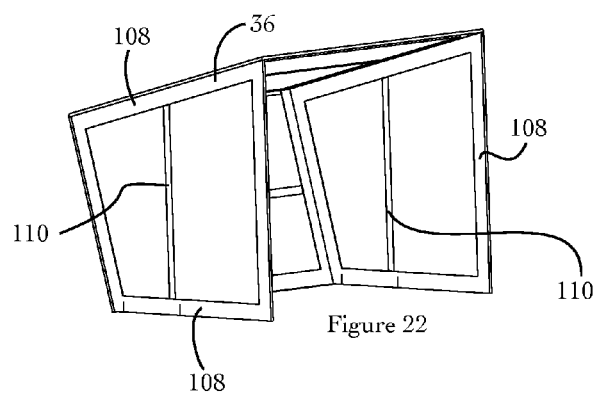
FIG. 22 is a perspective view of the hood of the support system of FIG. 1 positioned in the enlarged, operational orientation.
Figure 23:
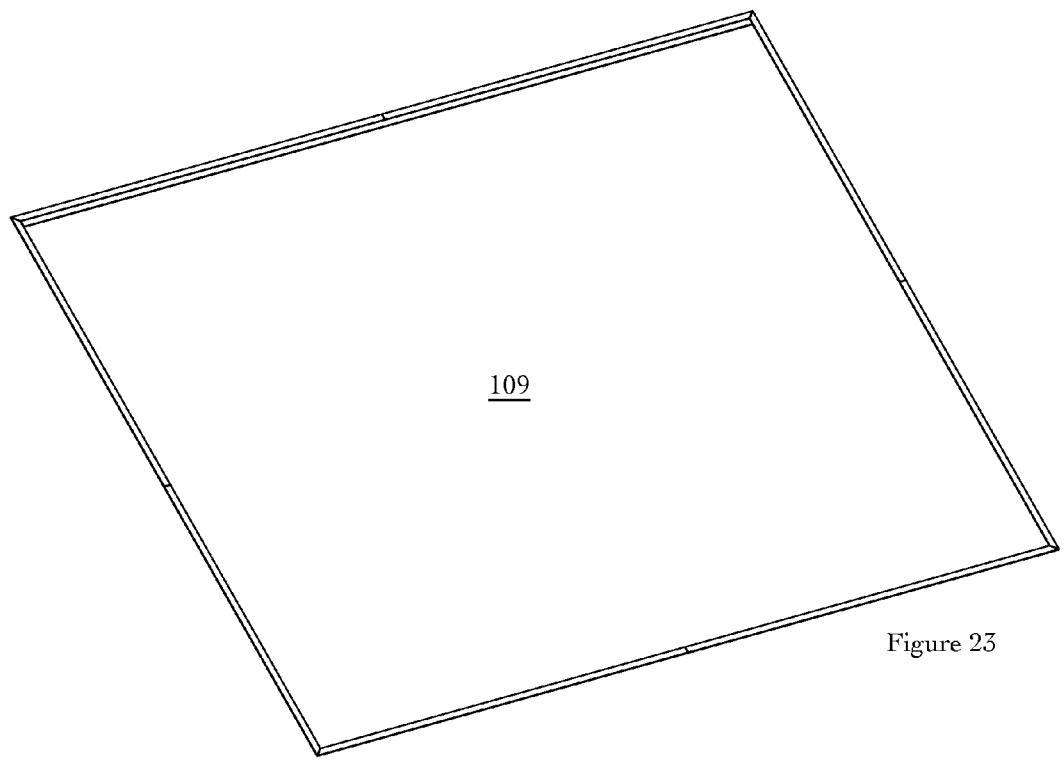
FIG. 23 is a perspective view of a curtain that can be attached to the opening bordered by the front of the hood and the support platform of FIG. 1 to allow the laptop to be completely enclosed.
Figure 24:
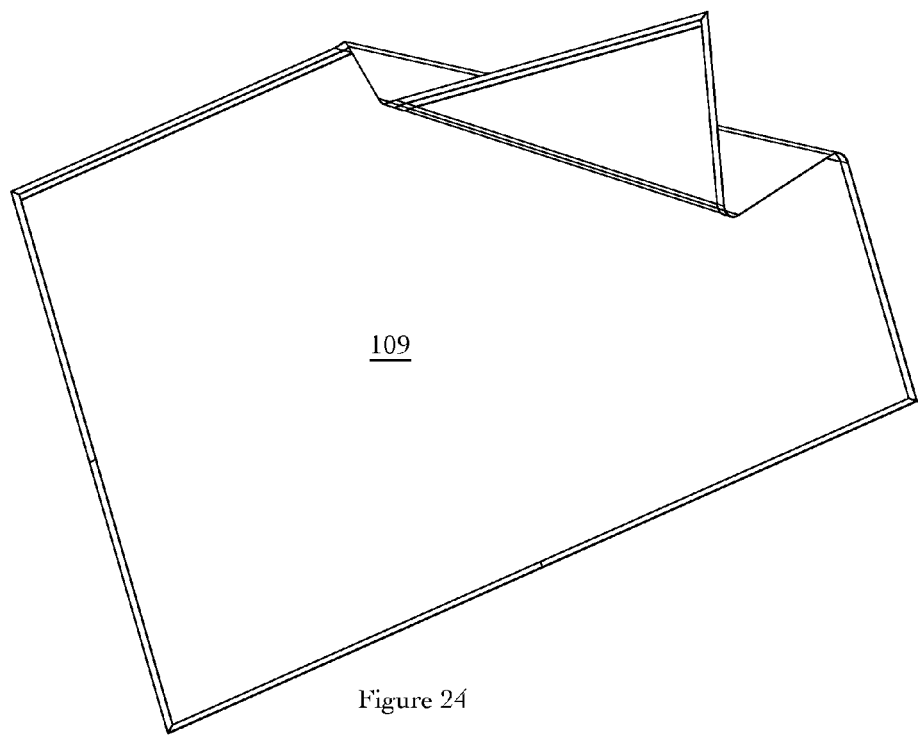
FIG. 24 is a perspective view of an opposite side of the curtain of FIG. 23.

Referring to FIGS. 1, 2, and 11-13, a tripod 34 may be detachably engaged to the second major exterior surface layer 78B to secure the support platform 56 in a desired position. Referring to FIG. 1, a hood 36 that is detachably secured to the support platform 56 and configured to cover all but one side of the electronic device 32 positioned on the support platform 56 to reduce glare when a user operates the electronic device 32. The hood 56 is preferably made of corrugated plastic (which may be white) that can be bonded with heavy weight fabric (such as nylon or any other suitable material) on top and bottom. All edges may be two inch adhesive backed hook and loop material 108, depending on the opposing surface, seams are either the same or adhesive backed fabric. Alternatively, hook and loop material 108 may be sewn onto the edges of the hood panels 36A, 36B, 36C, depending on the opposing surface. The bendable seams 110 of the hood panels 36A, 36B, 36C can be formed by bendable hinges comprising adhesive backed fabric. This can be the same fabric as that used to cover the corrugated plastic which can be incorporated into the hood 56. Referring to FIGS. 20-22, the top and back sections 36A, 36B are preferably one piece, hinged with adhesive backed fabric to allow them to be folded up for smaller storage. The side panels 36C cam be separate pieces, each one hinged in the middle via a bendable seam 110 for smaller storage.

When assembled the hood 36 rests on top of the support platform 56. It preferably attaches to strips of hook and loop material glued to the top surface of the support platform itself, along the edges of the left, right and rear. The hood can be formed by multiple hinged panels such that the hood can be folded into a compacted orientation when not secured to the support platform 56.

The present invention also includes methods of supporting electronic devices, such as laptops 32 or the like. The steps of the method need not be performed in the recited order. The methods of the present invention preferably use the support system 30 described above. However, the methods of the present invention may operate with support systems having fewer or different components from those described above.

One preferred method of the present invention includes the steps of: providing a support platform 56 including first and second exterior surface layers 78A, 78B and a core 88. The core 88 preferably compromises polymer and first and second major exterior surface layers 78A, 78B. The support platform 56 can be configured to support a laptop 32 thereon.

The method may include attaching the support platform 56 to a tripod 34 and providing at least one blocker 44 and at least one dynamic hold down 42 on the first major exterior surface layer 78A of the support platform 56. The at least one blocker 44 and the at least one dynamic hold down 42 may be detachably engageable at multiple locations 46, 48 along the first major exterior surface layer 78A to allow laptops, or other electronic devices, 32 of varying sizes to be secured to the support platform.

The method may include detachably locating a supplemental hard drive 50 in the core 88 and detachably locating a battery 54 in the core 88.

The laptop 32 can be positioned on the support platform 56 and the at least one blocker 44 and the at least one dynamic hold down 42 can be adjusted to secure the laptop 32 thereto.

A hood 36 may be provided that can be formed by a plurality of panels 36A, 36B, 36C that are hinged together to allow the hood 36 to move between a compacted orientation (shown in FIG. 20) and an enlarged operational orientation (shown in FIG. 22). The panels 36A, 36B, 36C may be bendable and/or detachable from each other. The hood 36 may be detachably securable to the support platform 56. The step of providing a hood 36 may include the plurality of panels being hinged together using hook and loop material 108 and the hood 36 being detachably engageable with the support platform 56 via hook and loop material. A curtain 109 may be detachably attached to the hood 36 to completely enclose the electronic device supported on the support platform 56.

The first and second major exterior surface layers 78A, 78B of the support platform 56 may be formed by a paint layer, wood, steel, aluminum, polymer, polymer having a higher density than the core 88, or any other suitable material. The support platform 56 may define a hole 58, 60 proximate to each of the supplemental hard drive(s) 50 and the supplemental battery(s) 54 located within the core to allow for manual detachment thereof.

The layers 78A, 78B may be secured to the core 88 via adhesive, welding, fastening or using any suitable method. Alternatively the layers 78A, 78B may be integrally formed with the core 88 and may be formed of the same or similar material as the core 88.

Computer numerical control equipment can be used to manufacture first and second polymer halves 62A, 62B and adhesive may be used to secure the first and second polymer halves 62A, 62B together to form the core 88.

An alternative preferred method according to the present invention includes the steps of: providing a support platform 56 comprising first and second exterior surface layers 78A, 78B and a core 88, the core 88 being formed using computer numerical control equipment to manufacture first and second polymer halves 62A, 62B which may then be secured together using adhesive to form the core 88, but any other method can be used to secure the layers without departing from the scope of the present invention, the support platform 56 may be configured to support a laptop 32 thereon; attaching the support platform 56 to a tripod 34; providing at least one blocker 44 and at least one dynamic hold down 42 on the first major exterior surface layer 78A of the support platform 56, the at least one blocker 44 and the at least one dynamic hold down 42 being detachably engageable at multiple locations along the first major exterior surface layer 78A to allow laptops 32 of varying sizes to be secured to the support platform 56; detachably locating a supplemental hard drive 50 in the core 88; detachably locating a battery 54 in the core 88; positioning the laptop 32 on the support platform and adjusting the at least one blocker 44 and the at least one dynamic hold down 42 to secure the laptop thereto; providing a hood 36 formed by a plurality of panels 36A, 36B, 36C that are hinged together to allow the hood to move between a compacted orientation and an enlarged operational orientation; the hood being detachably securable to the support platform, the hood being detachably engageable with the support platform via hook and loop material, a curtain 109 being detachably attached to the hood to completely enclose the laptop supported on the support platform.

Referring to FIGS. 1-25, one embodiment of the present invention is as follows. The support system 30 is preferably configurable for use with a choice of popular Apple Macintosh Laptops: 15" & 17" MacBook Pro and PowerBooks (Aluminum), as well as the 15" & 17" MacBook Pro (Unibody), as well as other laptops or electronic devices.

The laptop 32 is positioned on the platform 56 which may be constructed from lightweight PVC foam. The two halves 62A, 62B are preferably cut so that there is a lip that extends all the way around the edge of one half. The other half forms an inverse edge, by cutting a groove around the outer edge, so that when the 2 halves are assembled the lip fits into the groove, interlocking perfectly, thus creating exact alignment, as shown in FIGS. 6 and 7. This method creates substantial surface area for adhesion as well as a final product that is structurally sound. This method also allows sections of the unused internal mass to be removed thereby reducing overall weight.

The main support platform 56 preferably includes two hard drive cavities 66 on its right edge that fit Glyph Portagig hard drives among others. One battery cavity 68 may be in the back left that fits a NovusCell PPS130 external battery among other batteries. In the front of the support platform there can be a single drawer 40.

Figure 4:
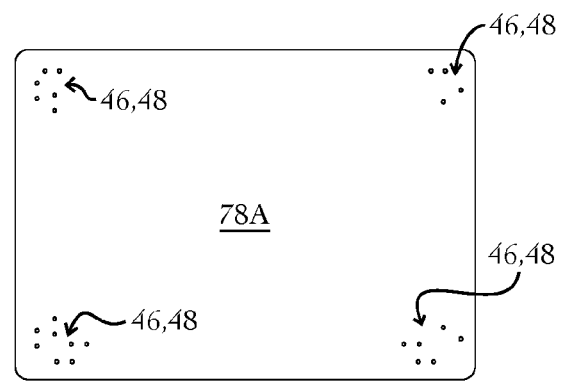
FIG. 4 is a top plan view of the support platform showing the first major exterior surface layer of the support platform of the support system of FIG. 1; Multiple holes are located proximate to the corners of the support platform to allow the dynamic hold downs and the blockers to be put in multiple locations to allow the support system to be used with laptops of various sizes.

Referring to FIGS. 4 and 10, there may be twenty four pre-drilled holes 46, 48 for use in attaching the blockers 44 and spring-loaded hold-downs 42 in different arrangements. Any number of holes 46, 48 can be used or they can be omitted altogether without departing from the scope of the present invention. On the top surface the holes are sized to fit the shaft of the fastener 84. On the underside these same holes are large enough to fit the heads of the same screws. Beneath, there are also finger holes/cutouts 58, 60 for each hard drive cavity 66 as well as for the battery cavity 68.

Each finger hole is preferably paired with an arrow cutout pointing in the direction that one must push/pull the device to remove it from its slot. On the bottom surface of the support platform 56, there may be two integrated threaded inserts: one for a ⅜" thread and the other for a ¼" thread, which are the standard mounting screw sizes.

The inserts are of a type that have an internally threaded barrel of metal topped with a flange. Out of this flange are sharp protrusions that grip the material it is inserted into so that there is no unwanted slipping or pull out. In manufacture a hole is drilled of the appropriate size to fit the barrel and a pocket is created to snugly fit the flange thickness within the platform. Before assembly the inserts are pressed into the appropriate hole and the teeth are forced into the surrounding material.

The blockers 44 may be made of black plastic. They are preferably cylindrical. The bottom can have a tapped hole that extends almost all the way to the top, allowing the screw to lend additional rigidity to the blocker 44 when installed. The dynamic hold-downs 42 can be made of black plastic. There is preferably a hole drilled through the side with 2 staggered sizes. The side with the larger hole can be tapped partially through. An internally threaded shaft of the same size as the smaller hole may be inserted into the corresponding hole. There may be a screw with a head of the same size as the larger hole screwed into the internal side of the shaft. The external end can have a disk of plastic with a raised edge on the outside face with a counter sunk hole in the middle into which a screw is used to attach it to the threaded shaft. A self-adhesive rubber tip 41 may be adhered to the outside face of the small plastic disc, covering the screw head. Then a spring can be inserted into the larger hole, and a short holding setscrew is threaded in flush with the outer edge of the main plastic cylinder. The bottom face may have two tapped holes drilled in it to allow it to be attached to the support system 30.

Taking into account the potential for heat expansion of both the hard drive 50 and the surrounding plastic, each hard drive cavity 66 is preferably slightly larger than the hard drive 50 to promote an easy fit. On its bottom surface may be grooves to allow the rubber bumpers on the bottom feet of the hard drive to pass without catching. Near the back of the hard drive cavity 66 may be a ball catch installed in the sidewall. It can be positioned so that when a hard drive 50 is inserted into the slot, the rear of the hard drive 50 pushes past the ball catch 106 which releases into a pre-existing groove in the hard drive's side. This locks the hard drive 50 in position.

The battery cavity 64 employs a similar concept but a different arrangement of the above ideas. Two plungers 106 may be used. One plunger 106 can be located at the very front of the compartment, so that the battery 54 depresses it while it is being inserted into the slot, but it is positioned so that when the battery 54 is inserted all the way, it releases just in front of the battery 54, thus providing a positive lock. The second plunger/ball catch 106 can be located a third of the way back on the opposing side of the battery cavity 64. Its purpose is three-fold: 1) it pushes the battery against the opposite side wall to increase friction and help keep the battery 54 in the battery cavity 64, 2) it actively reduces slop so that if the unit is shaken or falls it is less likely to build up enough force to push past the front catch 106, and 3) it forces the battery 54 to push against the base of the front ball catch 106 which requires the greatest force to depress.

The drawer 40 may use a type of existing spring catch 74 that extends a foot when its trigger is depressed. This foot remains extended and the trigger depressed until an additional push fully depresses the trigger again. This retracts the foot and extends the trigger. There may be a catch of this type inserted in a specially cut pocket on the center of the rear wall of the drawer, one on the top and one on the bottom. When activated they may extend into a rectangular pocket cut into the top and bottom surfaces at the rear of the drawer slot. The front edge of this pocket can be reinforced by insetting a thin piece of harder material, such as polymer, plastic, aluminum, or any other suitable material. To reduce the sensitivity of the catches, springs 76 may be inserted into holes cut into the back of the drawer slot and the drawer may be cut shorter than the provided slot. The combination of these two things require the drawer to be depressed further and with more force to activate the spring catch 74. When the drawer is locked in, the springs function to push the drawer forward so that it may be flush with the front edge of the support system 30. When the catch 74 is released, the same springs 76 push the drawer out far enough to be easily grabbed.

The hood 36 and dark cloth/curtain 109 systems allows the user to be able to view the screen of the laptop or other electronic device without glare. While it is preferred that the curtain 109 be formed of ripstop nylon, those of ordinary skill in the art will appreciate from this disclosure that any suitable material can be used to form the curtain 109 without departing from the scope of the present invention. The Hood 36 preferably provides a surround on three sides open to the front. The curtain 109 may attach to the front edge of the hood, and is draped over the user/s and allowed to hang behind them, thus reducing any glare from the front. The hood 36 can be formed by three panels: two side panels 36C and one top/back panel 36A, 36B. The three panels are preferably, but not necessarily, bendable and detachably hingable to each other.

Each panel is preferably constructed of sections of corrugated plastic sandwiched between heavy water resistant nylon fabric using an adhesive agent. White fabric is preferably used for the outside (deflecting heat) and black fabric for the inside (absorbing light). The plastic sections of each panel are preferably separated by a small space during construction so that the resulting areas of fabric stuck to fabric can act as a hinge for reduced size for easy transportation and storage.

Each edge may be wrapped in 2-inch wide hook and loop material. The edges preferably use differing portions of the hook and loop material that are designed to stick together. Each side can have a section towards the rear on the bottom edge that has had the plastic cut out to form a passage for cables, the hook and loop in this area can easily be lifted to allow this, while springing back to reduce light leaks.

Figure 26:
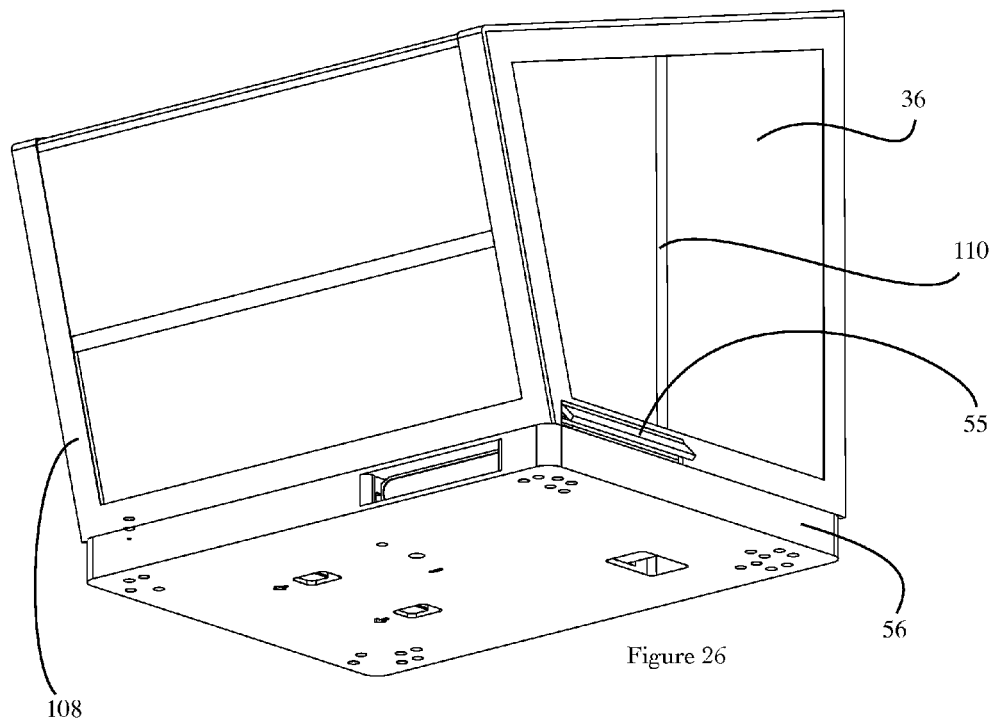
FIG. 26 is a perspective view of the hood showing a flap which can be integrated therein to facilitate the running of cords between the electronic device on the support platform and external devices.
Figure 27:
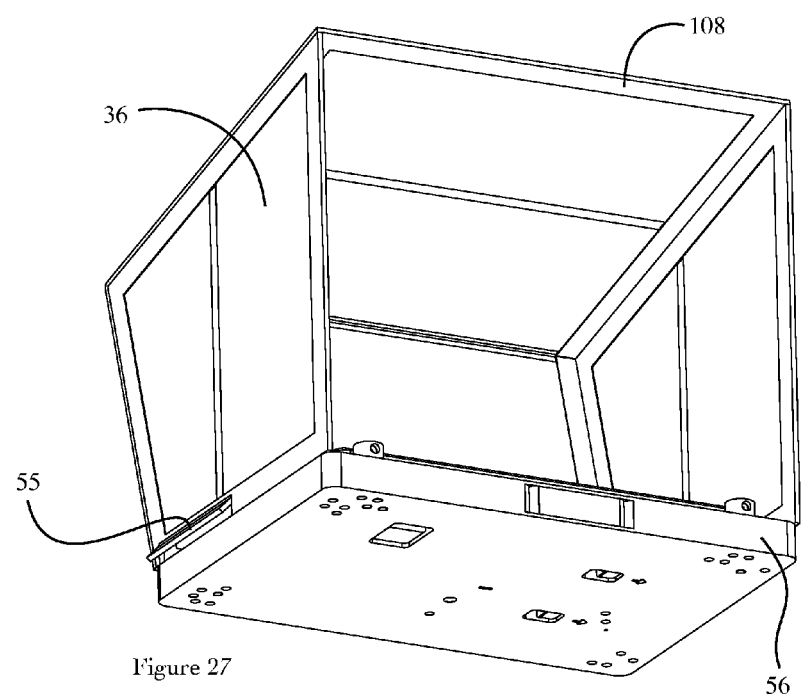
FIG. 27 is a second perspective view illustrating the flap in the hood.

Referring to FIGS. 26 and 27, the hood may include one or more generally vertical slits therein to form a flap(s) 55. It is preferable that any flaps are located in the hook and loop material. The flap(s) 55 allow for cords, cables, and conduits to pass through the hood while substantially reducing and/or preventing light leakage through the hood.

The preferred shape of the hood allows the screen of the laptop 32 or other electronic device to be tilted back and the front opening has been enlarged vertically to allow easy viewing at a wide range of angles. The hood 36 is easily attached to the main platform 56 by sticking its bottom edge of loops to narrow strips of hooks that are adhered to the top surface of the main platform on the back edge and on the two side edges. This allows the hood to be easily removed and stored away in case of windy conditions, or in situations where the hood is not desired.

The curtain and/or dark cloth 109 can be made of two rectangular sheets of ripstop nylon which is lightweight and tear/water-resistant. White fabric may be used for the outside (deflecting heat) and black fabric may be used for the inside (absorbing light). The two pieces are hemmed together on all edges. Sections of hook then loop material can be alternately sewn along all 4 edges of the one side. Swapping at each corner and in the middle of each side. On one edge there can be a second row of hook and loop material. This edge may be used to attach the dark cloth to the hood.

It is recognized by those skilled in the art that changes may be made to the above described support system 30 without departing from the broad inventive concept thereof. While the support system 30 is frequently described in conjunction with a laptop 32, those of ordinary skill in the art will appreciate from this disclosure that the support system 30 can be used with any electronic device without departing from the scope of the present invention. It is understood, therefore, that this invention is not limited to the particular embodiments disclosed, but is intended to cover all modifications which are within the spirit and scope of the invention as defined by the above specification, the appended claims and/or shown in the attached drawings.

What is claimed is:

1. A system configured to support an electronic device, comprising:
    a support platform comprising first and second major exterior surface layers and a core, the core comprising polymer, the support platform being configured to support a laptop thereon;
    at least one blocker located on the first major exterior surface layer of the support platform, the at least one blocker being detachably engageable at multiple locations along the first major exterior surface layer;
    at least one dynamic hold down located on the first major exterior surface layer of the support platform and adapted to, in combination with the at least one blocker, secure the laptop in position on the first major exterior surface layer of the support platform, the at least one dynamic hold down being detachably engageable at multiple locations on the first major exterior surface layer;
    wherein the core defines at least one battery cavity adapted to detachably engage a battery positioned therein and secure the battery spaced apart from the laptop while allowing the battery to power the laptop without having to remove the battery from the at least one battery cavity, the core also defines at least one hard drive support cavity adapted to detachably engage a hard drive positioned therein and spaced apart from the laptop so that the hard drive can be used by the laptop without having to remove the hard drive from the at least one hard drive cavity.

2. The system of claim 1, wherein the first and second major exterior surface layers are formed by the same polymer as the core.

3. The system of claim 2, further comprising a hood that is detachably secured to the support platform and configured to cover all but one side of the electronic device positioned on the support platform to reduce glare when a user operates the electronic device.

4. The system of claim 3, wherein the hood is formed by multiple bendable and detachable panels such that the hood can be folded into a compacted orientation when not secured to the support platform.

5. The system of claim 1, wherein the core is formed by first and second polymer sections, the first and second polymer sections being secured together in a coextensive fashion via an adhesive layer to form the core, the first polymer section including the first major exterior surface layer, the second polymer section including the second major exterior surface layer.

6. The system of claim 5, wherein the core further comprises a drawer which is extendable from the core and also generally formed by a polymer, each of the at least one dynamic hold down comprising:
    a pillar configured to detachably engage the support platform so that a pillar longitudinal axis of the pillar is generally perpendicular to a plane formed by the support platform;
    a plunger slideably positioned within the pillar and configured so that a plunger longitudinal axis is generally perpendicular to the pillar longitudinal axis; and
    a biasing element configured to drive the plunger generally outwardly from the pillar; the second major exterior surface of the support platform defining a plurality of holes configured to allow a user to manually eject a hard drive from the at least one hard drive cavity and to allow a user to manually eject a battery from the at least one battery cavity.

7. A method of supporting an electronic device, comprising the steps of:
    providing a support platform having first and second exterior surface layers, the support platform being configured to support a laptop thereon;
    providing at least one blocker and at least one dynamic hold down on the first major exterior surface layer of the support platform, the at least one blocker and the at least one dynamic hold down being detachably engageable at multiple locations along the first major exterior surface layer to allow laptops of varying sizes to be secured to the support platform;
    detachably locating a supplemental hard drive in the support platform, the supplemental hard drive being spaced apart from the laptop but configured for use by the laptop without needing to remove the supplemental hard drive from the support platform;
    detachably locating a battery in the support platform, the battery being spaced apart from the laptop but configured for use by the laptop without needing to remove the battery from the support platform; and positioning the laptop on the support platform and adjusting the at least one blocker and the at least one dynamic hold down to secure the laptop thereto.

8. The method of claim 7, further comprising providing a hood formed by a plurality of panels that are hinged together to allow the hood to move between a compacted orientation and an enlarged operational orientation; the hood being detachably securable to the support platform.

9. The method of claim 8, wherein the step of providing a hood further comprises the plurality of panels further comprising bendable seams, the plurality of panels being hinged together using hook and loop material and the hood being detachably engageable with the support platform via hook and loop material, a curtain being detachably attached to the hood to completely enclose the electronic device supported on the support platform.

10. The method of claim 7, wherein the step of providing the support platform further comprises the first and second major exterior surface layers of the support platform being formed by a paint layer.

11. The method of claim 10, wherein the step of providing a support platform further comprises the support platform defining a hole proximate to each of the supplemental hard drive and the supplemental battery located within the support platform to allow for manual detachment thereof.

12. The method of claim 7, wherein the step of providing the support platform further comprises the first and second major exterior surface layers of the support platform being formed by wood.

13. The method of claim 7, wherein the step of providing the support platform further comprises the first and second major exterior surface layers each being formed by a layer of metal secured to a core.

14. The method of claim 7, wherein the step of providing the support platform further comprises the first and second major exterior surface layers being formed by polymer.

15. The method of claim 7, wherein the step of providing the support platform further comprises the first and second major exterior surface layers being formed by another polymer which has a higher density than a remainder of the support platform.

16. The method of claim 7, wherein the step of providing a support platform further comprises forming the core by: using computer numerical control equipment to manufacture first and second polymer halves; using adhesive to secure the first and second polymer halves together to form the core.

17. A system configured to support an electronic device, comprising:
a support platform having first and second major exterior surface layers;
at least one blocker located on the first major exterior surface layer of the support platform, the at least one blocker being detachably engageable at multiple locations along the first major exterior surface layer;
at least one dynamic hold down located on the first major exterior surface layer of the support platform and adapted to, in combination with the at least one blocker, secure the laptop in position on the first major exterior surface layer of the support platform, the at least one dynamic hold down being detachably engageable at multiple locations on the first major exterior surface layer; and
wherein the support platform defines at least one battery cavity adapted to detachably engage a battery positioned therein and secure the battery spaced apart from the laptop while allowing the battery to power the laptop, the support platform also defines at least one hard drive support cavity adapted to detachably engage a hard drive positioned therein and secure the hard drive spaced apart from the laptop while allowing the laptop to use the hard drive.

18. The system of claim 17, wherein the hood is formed by multiple bendable and detachable panels such that the hood can be folded into a compacted orientation when not secured to the support platform.

19. The system of claim 5, wherein the laptop support further comprises a drawer which is extendable from the laptop support, the system further comprising: at least one dynamic hold down comprising:
a pillar configured to detachably engage the support platform so that a pillar longitudinal axis of the pillar is generally perpendicular to a plane formed by the support platform;
a plunger slideably positioned within the pillar and configured so that a plunger longitudinal axis is generally perpendicular to the pillar longitudinal axis; and
a biasing element configured to drive the plunger generally outwardly from the pillar;
the second major exterior surface of the support platform defining a plurality of holes configured to allow a user to manually eject a hard drive from the at least one hard drive cavity and to allow a user to manually eject a battery from the at least one battery cavity.

20. A system configured to support an electronic device, comprising:
a support platform comprising first and second major exterior surface layers and a core, the support platform being configured to support a laptop thereon;
at least one blocker located on the first major exterior surface layer of the support platform, the at least one blocker being detachably engageable at multiple locations along the first major exterior surface layer;
at least one dynamic hold down located on the first major exterior surface layer of the support platform and adapted to, in combination with the at least one blocker, secure the laptop in position on the first major exterior surface layer of the support platform, the at least one dynamic hold down being detachably engageable at multiple locations on the first major exterior surface layer;
wherein the core defines at least one battery cavity adapted to detachably engage a battery positioned therein and secure the battery spaced apart from the laptop while allowing the battery to power the laptop without having to remove the battery from the at least one battery cavity, the core also defines at least one hard drive support cavity adapted to detachably engage a hard drive positioned therein and spaced apart from the laptop so that the hard drive can be used by the laptop without having to remove the hard drive from the at least one hard drive cavity.

* * * * *